(12) United States Patent
Ryu

(10) Patent No.: US 8,422,863 B2
(45) Date of Patent: Apr. 16, 2013

(54) VIDEO INFORMATION PLAYBACK METHOD, VIDEO INFORMATION PLAYBACK DEVICE, RECORDING MEDIUM AND VIDEO CONTENT

(75) Inventor: Tomoaki Ryu, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 99 days.

(21) Appl. No.: 13/127,419

(22) PCT Filed: Dec. 3, 2009

(86) PCT No.: PCT/JP2009/006583
§ 371 (c)(1),
(2), (4) Date: May 3, 2011

(87) PCT Pub. No.: WO2010/064433
PCT Pub. Date: Jun. 10, 2010

(65) Prior Publication Data
US 2011/0211808 A1    Sep. 1, 2011

(30) Foreign Application Priority Data

Dec. 4, 2008 (JP) ................................ 2008-309931
Aug. 26, 2009 (JP) ................................ 2009-195114

(51) Int. Cl.
H04N 9/80 (2006.01)
H04N 5/89 (2006.01)
H04N 5/765 (2006.01)
H04N 5/783 (2006.01)
H04N 5/917 (2006.01)
G06F 13/00 (2006.01)

(52) U.S. Cl.
USPC ........................................................ 386/248

(58) Field of Classification Search .................. 386/248, 386/234, 329, 332, 344, E5.002, E5.064, 386/E9.013; 711/104, 115, 171, E12.001, 711/E12.002
See application file for complete search history.

(56) References Cited

U.S. PATENT DOCUMENTS 7,369,747 B2 * 5/2008 Ando et al. .................. 386/248
2008/0075419 A1   3/2008 Okubo et al.
2009/0144490 A1 * 6/2009 Sridhar et al. ............... 711/104
(Continued)

FOREIGN PATENT DOCUMENTS

JP    2006-23001 A    8/2006
JP    3837427 B2     10/2006
(Continued)

*Primary Examiner* — Thai Tran
*Assistant Examiner* — Syed Hasan
(74) *Attorney, Agent, or Firm* — Birch, Stewart, Kolasch & Birch, LLP

(57) ABSTRACT

Provided is a video information playback method of reducing a wait time until playback is resumed when resume playback of a content whose video playback can be controlled by a program operating in a virtual machine. After playback of the content is stopped in the resume playback, the program operating in the virtual machine determines whether or not the content to be playback-resumed is a content whose playback is possible either when the program operating in the virtual machine is activated or deactivated. The information of the determining indicating whether the playback is enabled or disabled is recorded in a nonvolatile memory. When a playback resume instruction is inputted, the information of the determining related to the content to be playback-resumed is read out. When the content is determined to be playback-enabled, playback is resumed from the playback stop position without activating the program operating in the virtual machine. Otherwise, the program operating in the virtual machine is activated, and then the playback is resumed.

24 Claims, 12 Drawing Sheets

U.S. PATENT DOCUMENTS

2010/0260489 A1 10/2010 Okada et al.
2011/0122740 A1 5/2011 Kawakami et al.

FOREIGN PATENT DOCUMENTS

| | | |
|---|---|---|
| JP | 2009-193642 A | 8/2009 |
| JP | 2010-33628 A1 | 2/2010 |
| WO | WO 2004/025651 A1 | 3/2004 |
| WO | WO 2006/028132 A1 | 3/2006 |

* cited by examiner

```
xxx.plst(){
    number_of_stream
    for(stream_id=0; stream_id < number_of_stream;stream_id++){
        stream_file_name;
        in_time;
        out_time;
    }
}
```

```
zzz.clpi(){
    stream_info();
    index_info(){
        number_of_GOP;
        for(GOP_id=0; GOP_id < number_of_GOP;GOP_id++){
            start_PTS;
            relative_byte;
        }
    }
}
```

```
Movie.title(){
    number_of_title
    for(title_id=0; title_id < number_of_title;title_id++){
        title_type;
        title_attribute;
        if(title_type == 1){
            JAR_file_name;
        }
        else{
            PlayListL_file_name;
        }
    }
    next_title_id;
}
```

FIG. 8

```
package testappli;

import java.awt.Graphics;
import java.awt.Image;
    .
    .
import org.disc.net.DiscLocator;
    .
    .
```
T1

```
public class Test implements Xlet {
    private Timer1Task timer_tsk = null;
    private DiscLocator discLocator = null;
        .
        .
        .
    private int iPlayListID = 0;

private final int XPOS = 256;
    private final int YPOS = 256;

private final int I_POS[][] = {
            {0,    0, 128,  128},
            {0,  128, 128,  256},
                    .
                    .
            {128,   0, 256,  128},
                    .
                    .
            {256, 1152, 384, 1280},
    };
```
T2

```
CONTINUED FROM FIG. 8 public void initXlet(XletContext arg0) throws XletStateChangeException {
} public void startXlet() throws XletStateChangeException {
    scene = HSceneFactory.getInstance().getDefaultHScene();
    scene.setVisible(true);
    gr = scene.getGraphics();

try {
        ClassLoader classLoader = getClass().getClassLoader();
        Toolkit toolkit = Toolkit.getDefaultToolkit();
        mediaTracker = new MediaTracker(scene);
        int index = 0;
        URL     urlkey = classLoader.getResource(test_img.png);
        decode_img = toolkit.getImage(urlkey);
        mediaTracker.addImage(decode_img, index);
        mediaTracker.waitForAll();
    }
    catch (Exception e) {}                                          T3 try {
        iPlayListID = 1;
        discLocator = new DiscLocator(iPlayListID);
        mediaLocator = new MediaLocator(discLocator);
        player = Manager.createPlayer(mediaLocator);
        player.prefetch();
        player.start();
    }
    catch (NoPlayerException e) {}
    catch (IOException e) {}                                        T4
    catch (InvalidLocatorException e) {} timer_tsk = new Timer1Task();

} public void pauseXlet() {
} public void destroyXlet(boolean arg0) throws XletStateChangeException {
}

CONTINUED FROM FIG. 9

```
public class Timer extends TimerTask {
    public Timer timer1;
    int iCnt = 0;

public Timer1Task() {
        Timer timer1 = new Timer();
        timer1.schedule(this, 0, 1000);
    } public synchronized void run() {
        iCnt++;
        if(iCnt <= 30) {
            gr.drawImage(decode_img,XPOS,YPOS,XPOS+128,YPOS+128,I_POS[index][0],I_POS[index][1],I_POS[index][2],I_POS[index][3],null);
            return;
        }
    }
}
```

| 1 | 11 | 21 |
| 2 | 12 | 22 |
| 3 | 13 | 23 |
| 4 | 14 | 24 |
| 5 | 15 | 25 |
| 6 | 16 | 26 |
| 7 | 17 | 27 |
| 8 | 18 | 28 |
| 9 | 19 | 29 |
| 10 | 20 | 30 |

PLAYBACK STOP

ACTIVATING OF PROGRAM RUNNING IN JAVA VIRTUAL MACHINE

FIG. 11B

PLAYBACK RESUME — 1

FIG. 12

```
Movie.title(){
    number_of_title
    for(title_id=0; title_id < number_of_title;title_id++){
        title_type;
        title_attribute;
        if(title_type == 1){
            JAR_file_name;
            resume_enable          ← 41
        }
        else{
            PlayListL_file_name;
        }
    }
    next_title_id;
}
```

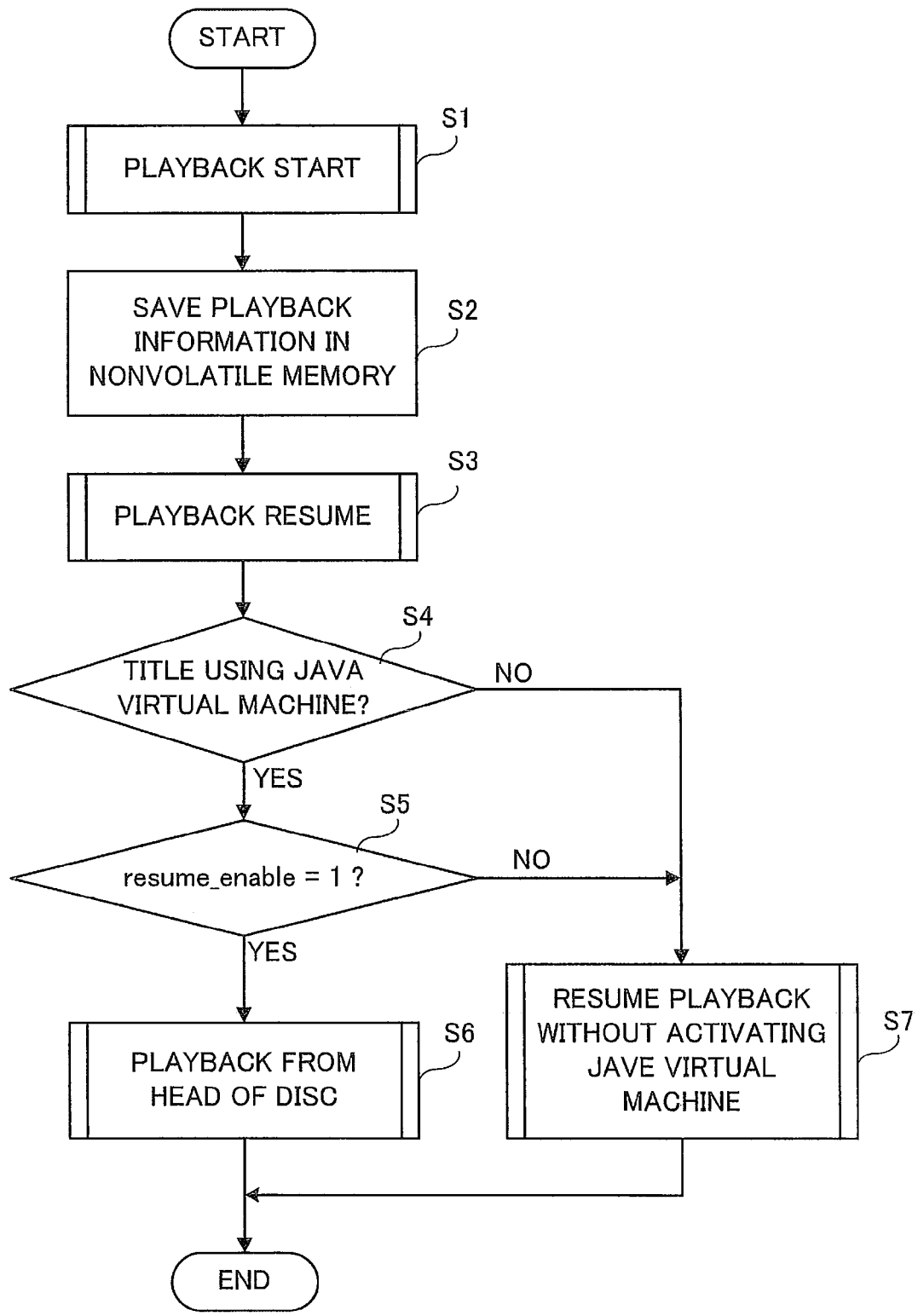

resume_enable = 0
NOT ACTIVATING OF PROGRAM
RUNNING IN JAVA VIRTUAL MACHINE

PLAYBACK STOP

PLAYBACK STOP

PLAYBACK RESUME resume_enable = 1
ACTIVATING OF PROGRAM RUNNING
IN JAVA VIRTUAL MACHINE

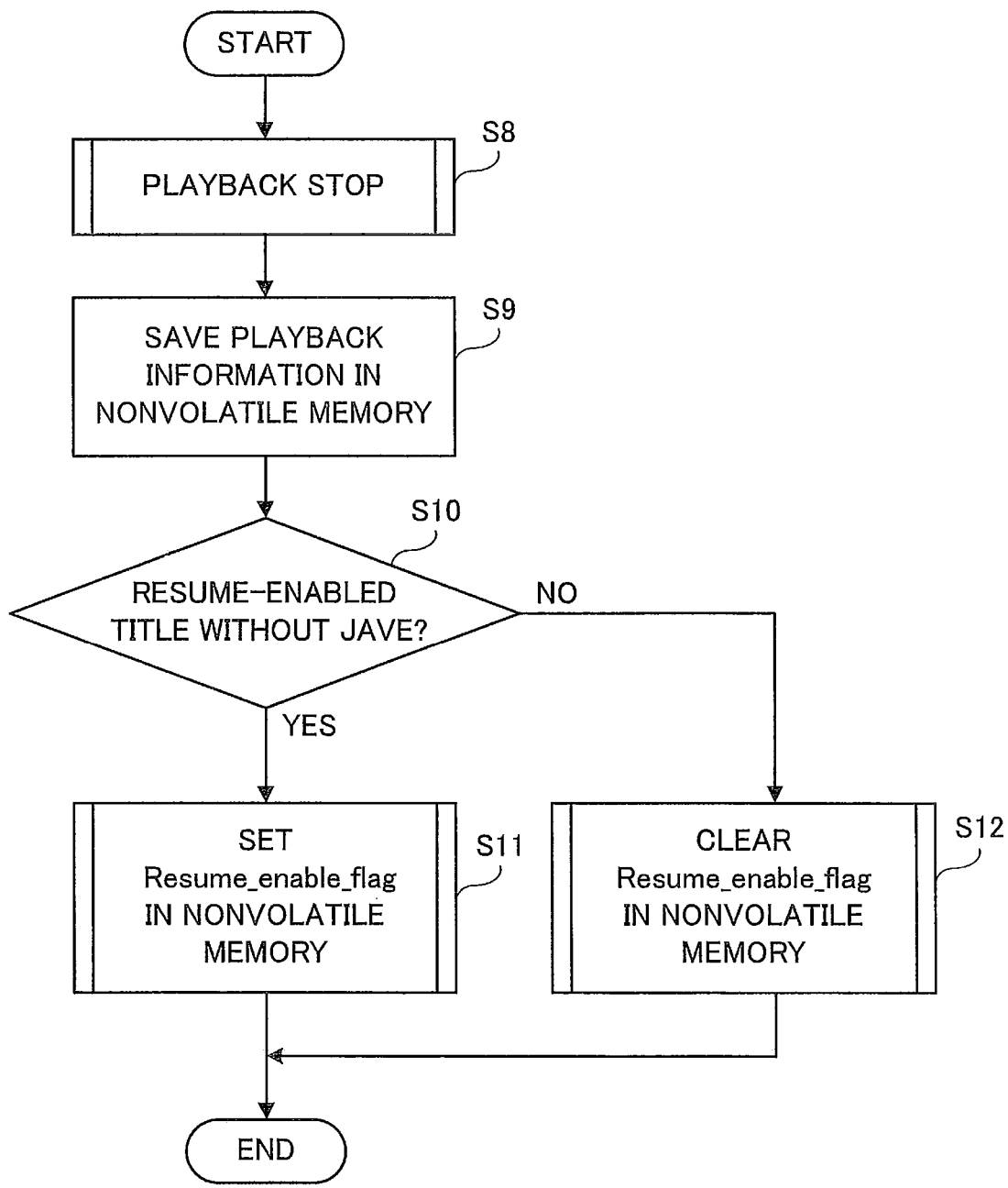

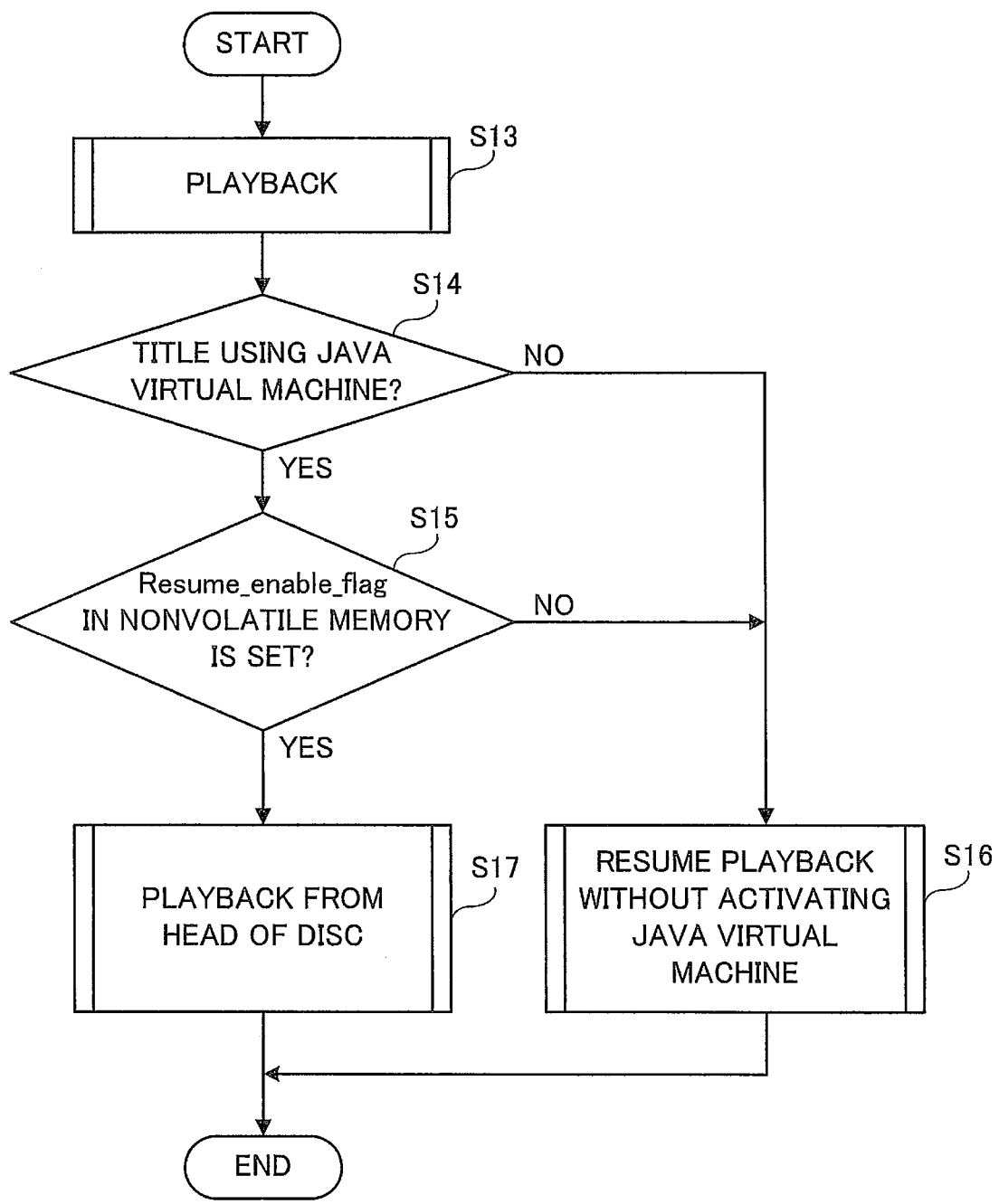

… # VIDEO INFORMATION PLAYBACK METHOD, VIDEO INFORMATION PLAYBACK DEVICE, RECORDING MEDIUM AND VIDEO CONTENT

BACKGROUND OF THE INVENTION

1. Technical Field

The present invention relates to a recording medium on which contents whose video playback can be controlled by a program running in a virtual machine is recorded, and a video information playback method and a video information playback device for playing back video from the recording medium.

2. Background Art

DVD players are used as apparatuses for playing back video contents such as movies and dramas. The DVD players use navigation commands which are comparatively simple control language in order to control video playback. Besides, Blu-ray players which can play back high-definition recorded contents are gradually prevailing. Blu-ray standards adopt Java virtual machines in order to make complicated and highly interactive contents viewable (see Patent Document 1, for example).

PRIOR ART DOCUMENT

Patent Document

Patent Document 1 is Japanese Patent No. 3837427 Publication.

SUMMARY OF THE INVENTION

Problems to be Solved by the Invention

DVD playback data includes video data, audio data, graphic data and video control data, and these data are superimposed in a single file. Generally, in a DVD player, when DVD playback is stopped (interrupted or suspended) and then playback restart (resume) is operated, playback is resumed from a playback stop position after a wait time of from several seconds to over ten seconds. In this case, because all data necessary for playback such as the video data and the audio data are superimposed in the single file, the playback can be resumed from the playback stop position by re-reading a management information file which has a very small file size, thus the wait time until playback resume is short.

However, in a Blu-ray player, when playback of content by using a Java virtual machine is stopped and then playback restart (resume) is operated, it is required to perform a playback operation again from a state immediately after inserting a Blu-ray disc into the device, playback is restarted from a head of video content currently being viewed, or it takes a time of several ten seconds to several minutes until playback is restarted. Thus, it is a problem that user convenience is greatly reduced in resume playback in the Blu-ray player.

The present invention is made to resolve the above-described problem and an object of the present invention is to provide a video information playback method, a video information playback device, a recording medium and video content capable of reducing a wait time when playback is resumed from a playback stop position, regarding content whose video playback can be controlled by a program running in a virtual machine.

Means of Solution of the Problems

A video information playback method according to the present invention is a video information playback method of playing back a virtual-machine-using content from a recording medium by a video information playback device; the recording medium having thereon: a virtual machine; one or more virtual-machine-using contents whose video playback can be controlled by a program running in a virtual machine; and a program for determining whether each of the one or more virtual-machine-using contents is a first type content capable of being played back either when the program running in the virtual machine is activated or deactivated, or a second type content capable of being played back only when the program running in the virtual machine is activated; the method including the steps of: determining whether the virtual-machine-using content is the first type content or the second type content when a playback stop instruction to stop playback of a virtual-machine-using content currently being played back is given from a user, thereby recording information of the determining in a memory of the video information playback device; reading the information of the determining regarding the virtual-machine-using content to be playback-resumed when a playback resume instruction is inputted to the video information playback device, thereby determining whether the virtual-machine-using content to be playback-resumed is the first type content or the second type content; and resuming playback from a playback stop position without activating the program running in the virtual machine if the virtual-machine-using content to be playback-resumed is determined to be the first type content, and resuming playback after activating the program running in the virtual machine if the virtual-machine-using content to be playback-resumed is determined to be the second type content.

A video information playback device according to the present invention is a video information playback device including a playback means for playing back a virtual-machine-using content from a recording medium, the recording medium having thereon: a virtual machine; one or more virtual-machine-using contents whose video playback can be controlled by a program running in the virtual machine; and program information for determining whether each of the one or more virtual-machine-using contents is a first type content capable of being played back either when the program running in the virtual machine is activated or deactivated, or a second type content capable of being played back only when the program running in the virtual machine is activated; the video information playback device including: a means for determining by the program whether the virtual-machine-using content is the first type content or the second type content when a playback stop instruction to stop playback of a virtual-machine-using content currently being played back is given from a user, and recording information of the determining in a memory of the video information playback device; a means for reading the information of the determining regarding the virtual-machine-using content to be playback-resumed when a playback resume instruction is inputted to the video information playback device, and determining whether the virtual-machine-using content to be playback-resumed is the first type content or the second type content; and a means for resuming playback from a playback stop position without activating the program running in the virtual machine if the virtual-machine-using content to be playback-resumed is determined to be the first type content, and resuming playback after activating the program running in the virtual machine if the virtual-machine-using content to be playback-resumed is determined to be the second type content.

A recording medium according to the present invention is a recording medium, on which information for playing back video content by the video information playback device is recorded, the information including: a virtual machine; one or more virtual-machine-using contents whose video playback can be controlled by a program running in a virtual machine; and a program running in the virtual machine for determining whether each of the one or more virtual-machine-using contents is a first type content capable of being played back either when the program running in the virtual machine is activated or deactivated, or a second type content capable of being played back only when the program running in the virtual machine is activated.

A video content according to the present invention is a video content to be played back by a video information playback device, the video content including: a virtual machine; one or more virtual-machine-using contents whose video playback can be controlled by a program running in the virtual machine; and a program running in the virtual machine for determining whether each of the virtual-machine-using contents is a first type content capable of being played back either when the program running in the virtual machine is activated or deactivated, or a second type content capable of being played back only when the program running in the virtual machine is activated.

Another video information playback method according to the present invention is a video information playback method of playing back a virtual-machine-using content from a recording medium by a video information playback device, the recording medium having thereon: a virtual machine; one or more virtual-machine-using contents whose video playback can be controlled by a program running in the virtual machine; and information of determining indicating whether each of the one or more virtual-machine-using contents is a first type content capable of being played back either when the program running in the virtual machine is activated or deactivated, or a second type content capable of being played back only when the program running in the virtual machine is activated; the method comprising the steps of: reading the information of the determining regarding the virtual-machine-using content to be playback-resumed, when a playback resume instruction is inputted to the video information playback device after playback of a virtual-machine-using content currently being played back is stopped, and determining whether the virtual-machine-using content to be playback-resumed is the first type content or the second type content; and resuming playback from a playback stop position without activating the program running in the virtual machine if the virtual-machine-using content to be playback-resumed is determined to be the first type content, and resuming playback after activating the program running in the virtual machine if the virtual-machine-using content to be playback-resumed is determined to be the second type content.

Another video information playback device according to the present invention is a video information playback device including a playback means for playing back a virtual-machine-using content from a recording medium, the recording medium having thereon: a virtual machine; one or more virtual-machine-using contents whose video playback can be controlled by a program running in the virtual machine; and information of determining indicating whether each of the one or more virtual-machine-using contents is a first type content capable of being played back either when the program running in the virtual machine is activated or deactivated, or a second type content capable of being played back only when the program running in the virtual machine is activated; the video information playback device including: a determination means for reading the information of the determining regarding the virtual-machine-using content to be playback-resumed when a playback resume instruction is inputted to the video information playback device after playback of the virtual-machine-using content currently being played back is stopped, and determining whether the virtual-machine-using content to be playback-resumed is the first type content or the second type content; and a playback control means for causing the playback means to resume playback from a playback stop position without activating the program running in the virtual machine if the virtual-machine-using content to be playback-resumed is determined to be the first type content, and causing the playback means to resume playback after activating the program running in the virtual machine if the virtual-machine-using content to be playback-resumed is determined to be the second type content.

Another recording medium according to the present invention is a recording medium to be played back by a video information playback device, the recording medium including: a virtual machine; one or more virtual-machine-using contents whose video playback can be controlled by a program running in the virtual machine; and information of determining indicating whether each of the one or more virtual-machine-using contents is a first type content capable of being played back either when the program running in the virtual machine is activated or deactivated, or a second type content capable of being played back only when the program running in the virtual machine is activated.

Another video content according to the present invention is a video content being played back by a video information playback device; the video content including: a virtual machine; one or more virtual-machine-using contents whose video playback can be controlled by a program running in the virtual machine; and information of determining indicating whether each of the one or more virtual-machine-using contents is a first type content capable of being played back either when the program running in the virtual machine is activated or deactivated, or a second type content capable of being played back only when the program running in the virtual machine is activated.

Effect of the Invention

According to an aspect of the present invention, if content whose playback is to be resumed is a first type content whose playback is possible either when a program running in a virtual machine is activated or deactivated, playback is resumed from a playback stop position without activating the program running in the virtual machine, thereby an effect to reduce a wait time until playback is resumed after playback resume is inputted by a user's operation.

BRIEF DESCRIPTION OF THE DRAWINGS

FIG. 8 is a diagram illustrating a head section of an example of a source code of a "test.class" file and a "test$timer.class" file in FIG. 7 before compiled;

FIG. 9 is a diagram illustrating a section subsequent to the section in FIG. 8 which illustrates the example of the source code of the "test.class" file and the "test$timer.class" file in FIG. 7 before compiled;

FIG. 10 is a diagram illustrating a section subsequent to the section in FIG. 9 which illustrates the example of the source code of the "test.class" file and the "test$timer.class" file in FIG. 7 before compiled;

FIGS. 11A and 11B are diagrams for explaining a video information playback method of a comparative example;

FIG. 12 is a diagram illustrating an example of syntax of the modified "Movie.title" file for implementing the video information playback method according to the first embodiment of the present invention;

FIG. 13 is a flowchart illustrating the video information playback method according to the first embodiment of the present invention;

FIG. 15 is a flowchart illustrating a video information playback method according to the second embodiment of the present invention; and FIG. 16 is a flowchart illustrating the video information playback method according to the second embodiment of the present invention.

DETAILED DESCRIPTION OF THE INVENTION

First Embodiment

Figure 1:
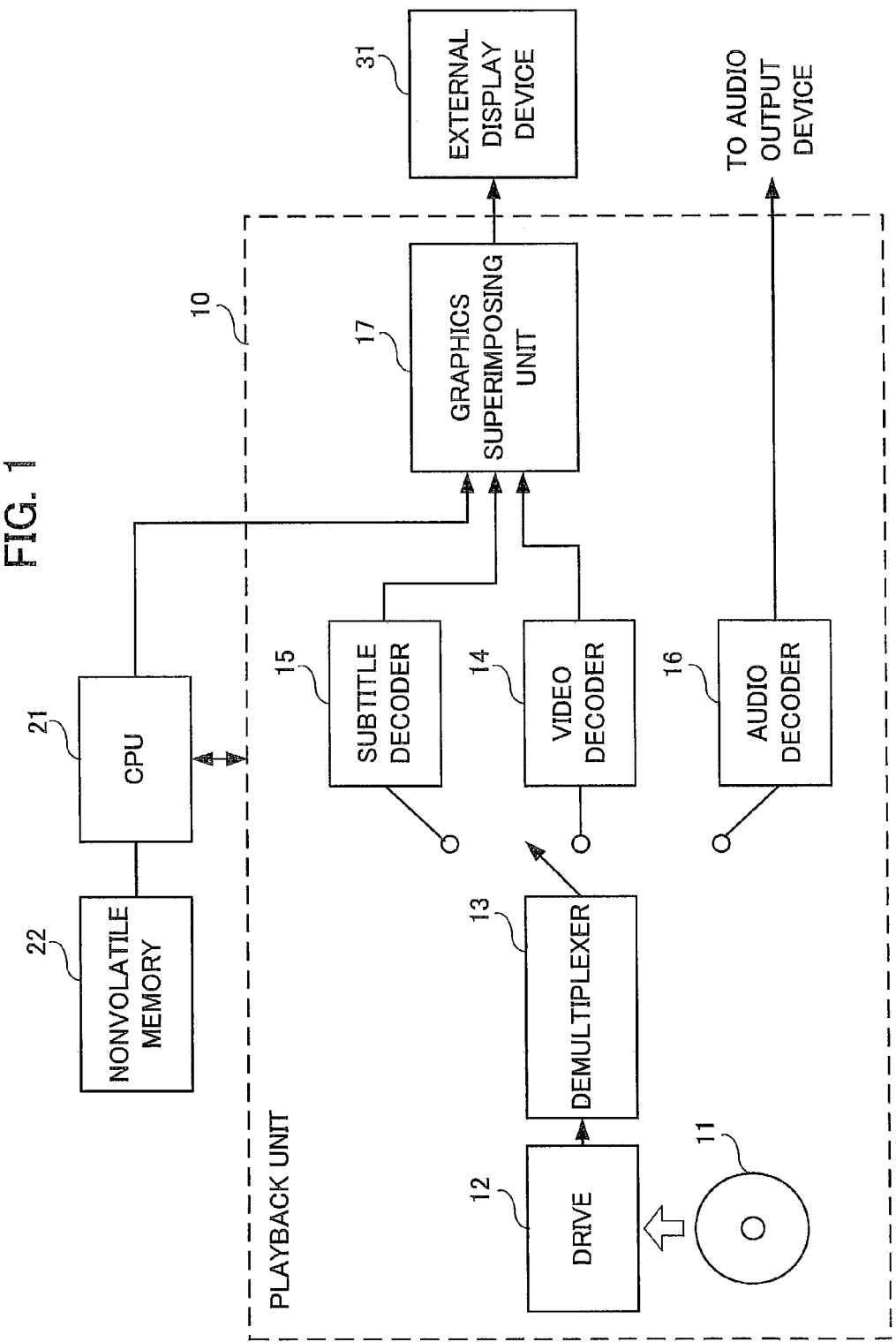
FIG. 1 is a block diagram schematically illustrating a structure of a video information playback device according to first and second embodiments of the present invention (i.e., a device capable of implementing a video information playback method according to the embodiments of the present invention)

FIG. 1 is a block diagram schematically illustrating a structure of a video information playback device according to a first embodiment (i.e., a device capable of implementing a video information playback method according to the first embodiment of the present invention). The video information playback device according to the first embodiment is a device for playing back contents from a recording medium on which one or more contents whose video playback can be controlled by a program running in a virtual machine are recoded. The recording medium according to the first embodiment is a disc-shaped recording medium such as an optical disc. Specific examples of the recording medium are a DVD, a CD, a Blu-ray disc (BD) and the like. Further, the virtual machine is a Java (registered trademark) virtual machine, for example.

As illustrated in FIG. 1, the video information playback device of the first embodiment includes a playback unit 10 as a playback means for playing back a recording medium on which information is recorded; a CPU 21 as a playback control means for controlling the entire device and executing a program which runs in the Java virtual machine; and a non-volatile memory 22. The playback unit 10 includes a drive 12 for reading information from an optical disc 11 which is an example of the recording medium; a demultiplexer 13 for separating data read by the drive 12 into various information such as video information, audio information; and subtitle graphic information; a video decoder 14 for decoding the video information; a subtitle decoder 15 for decoding the subtitle graphic information; an audio decoder 16 for decoding the audio information; and a graphic superimposing unit 17 for superimposing graphic information from the CPU 21 on the decoded video information and the decoded subtitle graphic information. A video signal outputted from the graphic superimposing unit 17 is supplied to an external display device 31 and then a video is displayed by the external display device 31. An audio signal outputted from the audio decoder 16 is supplied to an audio output device (not illustrated in the drawing) and then sound is outputted. Although the optical disc 11 is a Blu-ray disc in the first embodiment, another kind of recording medium may be also available.

In the first embodiment, a Java virtual machine, one or more virtual-machine-using contents whose video playback can be controlled by a program running in the Java virtual machine, and determination information are recorded on the optical disc 11. The determination information indicates whether each of the virtual-machine-using contents is a content (first type content) capable of being played back either when the program running in the Java virtual machine is activated or deactivated, or a content (second type content) capable of being played back only when the program running in the Java virtual machine is activated. Further, the optical disc 11 may have a content whose video playback is not controlled by the program running in the Java virtual machine (i.e., content without using a Java virtual machine).

In the video information playback device of the first embodiment, when a playback resume instruction is inputted from a user operation unit (not illustrated in the drawing) of the video information playback device after playback of a virtual-machine-using content currently being played back is stopped, the CPU 21 reads the determination information regarding the virtual-machine-using content to be playback-resumed and works as a determination means for determining whether the virtual-machine-using content to be playback-resumed is the first type content or the second type content. If the virtual-machine-using content to be playback-resumed is determined to be the first type content, the CPU 21 causes the drive 12 to play back from a playback stop position without activating the program running in the Java virtual machine. If the virtual-machine-using content to be playback-resumed is determined to be the second type content, the CPU 21 works as a playback control means for causing the drive 12 to resume playback after activating the program running in the Java virtual machine. If the virtual-machine-using content to be playback-resumed is determined to be the second type content, the CPU 21 causes the playback unit 10 to restart playback from a predetermined position, e.g., a head of the optical disc 11, a head of the virtual-machine-using content to be playback-resumed, or the like.

The program running in the Java virtual machine related to the first type content is a program which is selectively activated in response to a user's operation, for example; and the program running in the Java virtual machine related to the second type content is a program which is activated concurrently with playback of the second type content, for example.

Figures 2, 3:
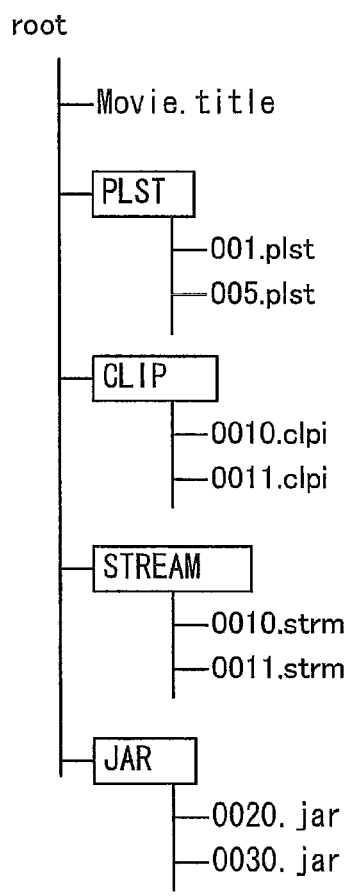
FIG. 2 is a diagram illustrating an example of a structure of files and directories necessary for playback which are recorded on a recording medium according to the first embodiment of the present invention.
FIG. 3 is a diagram illustrating an example of syntax of a plst file in FIG. 2.

FIG. 2 is a diagram illustrating an example of a structure of files and directories necessary for playback which are recorded on the optical disc 11 as the recording medium. In FIG. 2, a "Movie.title" file contains information necessary for controlling a title which is a unit of playback with highest hierarchy. In FIG. 2, "PLST" denotes a PLST folder which stores a file containing information necessary for playback control of playlist (PlayList). In the PLST folder, there is a plurality of plst files "xxx.plst", where "xxx" denotes a three-digit number. In FIG. 2, "STREAM" denotes a STREAM folder which stores a file necessary for playback of video information, audio information, graphic information and the like. In the STREAM folder, there is a plurality of stream files "yyy.strm", where "yyy" denotes a three-digit number. The stream file which includes TS (transport stream) adopted in digital broadcasting has a unique packet ID, and the video information, audio information, and the graphic information are superimposed in the stream file. In FIG. 2, "CLIP" denotes a CLIP folder which stores a clip file containing information necessary for playback control of the stream file. In the CLIP folder, there is a plurality of clip files "zzz.clpi", where "zzz" denotes a digit number. The clip file and the stream file correspond to each other: if there is a clip file "123.clpi" in the CLIP folder, the STREAM folder has a stream file "123.strm" which corresponds to the clip file "123.clpi". In FIG. 2, "JAR" denotes a JAR (Java ARchive) folder which stores an application for title playback control running on a Java virtual machine. In the JAR folder, there is a jar file "YYY.jar" in a ZIP format file in which a set of files necessary for running a Java application is compressed, where "YYY" denotes a three-digit number.

FIG. 3 is a diagram illustrating an example of syntax of the plst files "xxx.plst" in FIG. 2. In FIG. 3, "number_of_stream" denotes the total number of the stream files to be played back in a playlist (PlayList). A subsequent loop which starts from "for" is repeated the number of times indicated by "number_of_stream". In "stream_file_name" in this loop, a file name of a stream file to be played back is described. In "in_time" and "out_time", a start time and an end time of a portion to be played back in the stream file are described. These times are described in a PTS (Presentation Time Stamp) which is added to a packet of the stream file.

Figures 4, 5:
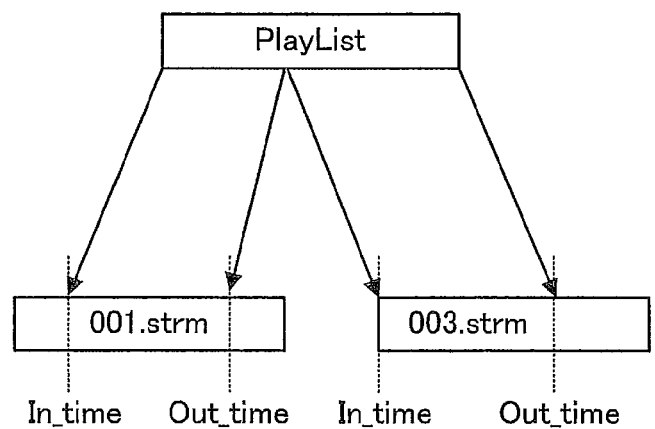
FIG. 4 is a diagram illustrating an example of a relationship between a playlist indicated by the plst file and a stream file in FIG. 2.
FIG. 5 is a diagram illustrating an example of syntax of a clip file in FIG. 2.

FIG. 4 is a diagram illustrating an example of a relationship between a playlist (PlayList) indicated by the plst file in FIG. 2 and the stream file. In FIG. 4, a playback of the playlist includes a successive playback of a part from "in_time" to "Out_time" in a stream file "001.strm" and a part from "in_time" to "Out_time" in a stream file "003.strm".

FIG. 5 is a diagram illustrating an example of syntax of the clip files "zzz.clpi" in FIG. 2. In FIG. 5, the clip file contains superimposed information such as video information and audio information, and index information necessary for random access and the like of the stream file corresponding to the clip file. In "stream_info( )", attribute information of superimposed video information, audio information and graphic information are described. However, "stream_info( )" does not relate to the present invention and therefore it will not be explained in detail. In "index_info( )", time information and position information of a head of a GOP in the stream file are described. "number_of_GOP" denotes the total number of GOPs (Group of Picture) included in the stream file. A subsequent loop which starts from "for" is repeated the number of times indicated by "number_of_GOP". "start_PTS" denotes PTS information of an I picture at a head of a GOP. "relative_byte" denotes a relative byte number from a head of the stream file to a head of an I picture.

Figures 6, 7:
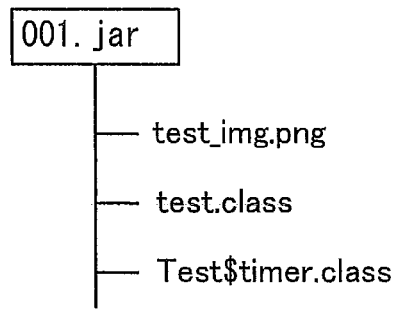
FIG. 6 is a diagram illustrating an example of syntax of a "Movie.title" file in a comparative example.
FIG. 7 is a diagram illustrating an example of a structure of a jar file in FIG. 2.

FIG. 6 is a diagram illustrating an example of syntax of a "Movie.title" file in a comparative example. When an optical disc on which the "Movie.title" file in FIG. 6 is recorded is inserted into the drive 12, the drive 12 read the "Movie.title" file from the optical disc according to a control by the CPU 21. In FIG. 6, "number_of_title" denotes the total number of titles recorded on the optical disc. A subsequent loop which starts from "for" denotes repeated the number of times indicated by "number_of_title". "title_type" is "1" if title playback is controlled by a Java application, otherwise "0". "title_attribute" is "1" if the title is a title for displaying a menu screen, otherwise "0". A subsequent if expression indicates that if "title_type" is "1", a file name of a jar file in which a Java application is stored is described. The jar file name is "123.jar", for example. Then, an else expression indicates that if "title_type" is "0", a playlist file to be played back is described. An example of the playlist file to be played back is "123.plst". "next_title_id" denotes that when playback of a title currently being played back is finished, "title_id" to be next played back is described.

By using the "Movie.title" file read from the optical disc by the drive 12, the CPU 21 firstly performs processing on the basis of title information described at a head. If conditions,
title_type=1,
title_attribute=0, and
the jar file is "001.jar",
are satisfied, the CPU 21 reads and analyzes "001.jar".

FIG. 7 is a diagram illustrating an example of a structure of the "001.jar" file which can be a jar file in the JAR folder in FIG. 2. FIG. 7 illustrates that the "001.jar" file includes three files: "test_img.png", "test.class" and "test$timer.class". The file "test_img.png" denotes a PNG format file in which image data used in the application is compressed. The files "test.class" and "test$timer.class" are executable files produced by compiling Java programs into an executable format. Because a file "****.class" denotes a compiled file, operations of the files "test.class" and "test$timer.class" will be explained below by using source code before compiled.

FIG. 8 is a diagram illustrating a head section of an example of the source code of "test.class" and "test$timer.class" in FIG. 7 before compiled. FIG. 9 is a diagram illustrating a section subsequent to the section in FIG. 8 which illustrates the example of the source code of "test.class" and "test$timer.class" in FIG. 7 before compiled. FIG. 10 is a diagram illustrating a section subsequent to the section in FIG. 9 which illustrates the example of the source code of "test.class" and "test$timer.class" in FIG. 7 before compiled.

The source code in FIG. 8 includes a T1 section for importing a package necessary for executing the application. "org.disc.net.DiscLocator" which is a package unique to the present embodiment is prepared for playlist playback, because playlist playback is not supported by Java.

The source code in FIG. 8 includes a T2 section for declaring a variable. I_POS[ ][ ] and the subsequence indicate graphic coordinate information used when display changes every second. When a sample image "sample_img.png" is decoded, images '1' to '30' illustrated in FIG. 11A are developed. For example, {128, 0, 256, 128} means to cut out a quadrilateral part having a coordinate (X1, Y1)=(128, 0) and another coordinate (X2, Y2)=(256, 128) as vertices (two vertices in a diagonal line), i.e., '11' in FIG. 11A is a part to be displayed.

The source code in FIG. 9 includes a T3 section for reading "sample_img.png" to decode a PNG file. After the decoding is completed, the processing proceeds to a T4 section of the source code in FIG. 9.

The source code in FIG. 9 includes the T4 section for executing playback of the playlist (PlayList). Since "iPlayListID=1" is described, playback of "001.plst" is instructed. In response to the instruction of playback of "001.plst", the demultiplexer 13 separates data read from the optical disc by the drive 12 into video information, audio information, and subtitle graphic information; the video information, the audio information, and the subtitle graphic information are decoded by the video decoder 14, the audio decoder 16 and the subtitle decoder 15, respectively.

Concurrently with starting the playback of the playlist (PlayList), graphic display of the images '1' to '30' is successively performed as illustrated in FIG. 11A by cutting out from the decoded PNG file, as described in a T5 section of the source code in FIG. 10. A graphic screen produced by the CPU 21, an output screen of the video decoder 14 and an output screen of the subtitle decoder 15 are superimposed at the graphic superimposing unit 17, and an image signal of the superimposed image is outputted to the external display device 31.

Playback of contents whose playback is controlled by a program running in the Java virtual machine thus enables to display more complex images in comparison with playback of content whose playback is not controlled by the program running in the Java virtual machine. However, the playback of content whose playback is controlled by the program running in the Java virtual machine has an inconvenience to wait for several ten seconds to several minutes until the playback is resumed after playback resume is instructed through a user's operation. Generally graphics used in a Java application is described so that decoding a PNG file is finished before the playback is resumed. The T3 section in FIG. 9 corresponds to time to decode the PNG data. A reason why PNG data or JPEG data are decoded before resuming playback is that the decoding the PNG data or the JPEG data is heavily-loaded processing for a CPU which is a built-in device to realize a specific function and so the decoding is performed while executing a program running in a Java virtual machine may disturb smooth graphic display.

FIG. 11A is a diagram for explaining a process of the playback of content whose playback is controlled by the program running in the Java virtual machine (by using the Java virtual machine). The playback of content includes playing back a single playlist file, displaying the panels with numerals '1' to '30' at one-second intervals after the playback starts, and terminating the application after the playback of playlist is completed. In this example, as illustrated in FIG. 11A, graphic images each having 128×128 pixels are sequentially displayed on a video screen of 1920×1080 pixels, from coordinates of 256 pixels in vertical and horizontal directions from the upper left. In a case of content whose playback is not controlled by the program running in the Java virtual machine (without using the Java virtual machine), even if playback is stopped (interrupted or suspended), it is possible to restart the playback from a playback stop position (resume playback). However, in a case of the content whose playback is controlled by the program running in the Java virtual machine, it is a problem that the resume playback is impossible. So, as illustrated in FIG. 11A, in the playback processing of displaying the graphics '1' to '30' in numerical order at one-second intervals, it is supposed that the playback is interrupted at a time of displaying the graphic '15'. In order to restart the playback from the time of displaying the graphic '15' (resume playback), it is necessary that all of states and information in the CPU 21 and an external memory (RAM) of the CPU 21 at the time of displaying the graphic '15' are saved and stored in a nonvolatile memory such as a flash memory. However, since a consumer built-in device required low-cost manufacturing cannot adopt such a configuration, it is actually impossible to have a function of restarting playback from a playback stop position.

Since the playback of content by using the Java virtual machine has the problem described above, when the user operates to resume the playback, it is necessary to wait for several ten seconds until the playback is started again from a head of the content as illustrated in FIG. 11B and further wait until the playback proceeds to the playback stop position, thus user convenience is greatly reduced at a time of restarting the playback.

FIG. 12 is a diagram illustrating an example of modified syntax of the "Movie.title" file for implementing the video information playback method according to an embodiment of the present invention. In the embodiment of the present invention, in order to avoid damage to user convenience when playback is restarted, the syntax of the "Movie.title" file is modified as illustrated in FIG. 12.

In a case of contents whose playback is controlled by the Java program running in the Java virtual machine, it is meaningless for some contents unless both videos based on video information recorded on the optical disc 11 and graphics produced by the Java program are displayed (it is impossible to provide the user with correct or adequate information). On the other hand, in other contents, only videos are displayed during normal playback, and graphics produced by the Java program are displayed only when the user operates by a remote controller or the like. For example, in a case of movie content produced by a Java application on a Blu-ray disc, when a pop-up (PopUP) menu key is operated during playback of a main program of the movie, a menu screen which is graphics in a Java program is displayed over video of the movie currently being played back, for selecting audio, selecting subtitles, searching a scene and the like. As this example indicates, in some contents, graphics displayed by a Java program have no influence on normal playback of video information recorded on an optical disc. Such content is capable of a quick resume playback, if it is possible to be treated in a similar manner to content whose playback is not controlled by a Java program running in a Java virtual machine (without using the Java virtual machine), notwithstanding a restriction that a function realized by the Java program cannot be used.

However, in the comparative example illustrated in FIG. 6, there is no means for knowing whether there is a trouble or not in playback of a main program of content whose playback can be controlled by the Java program running in the Java virtual machine, even if the Java program is not activated. For this reason, in the comparative example illustrated in FIG. 6, resume playback cannot be performed during playing back a main program of a movie.

So, in the video information playback method according to the embodiment of the present invention, information to be recorded on the optical disc 11 is modified as illustrated in FIG. 12, for example. The "Movie.title" file in FIG. 12 differs from the "Movie.title" file in FIG. 6 in an addition of information of the determining "resume_enable" denoted by a reference numeral 41. If "resume_enable" is "1", it means to be a title of content that playlist playback causes no trouble for the user (although causing some inconveniences for the user, it provides the user with correct or adequate information) without activating the Java program at a time of resume playback. If "resume_enable" is "0", it means to be a title of content that trouble is caused for the user (for example, it does not provide the user with correct or adequate information) without activating the Java program at a time of resume playback.

FIG. 13 is a flowchart illustrating the video information playback method according to the embodiment of the present invention. When a playback stop instruction is inputted through a user's operation (step S1), the CPU 21 stores in the nonvolatile memory 22 various information currently being played back such as "title_id", a file name, a playback time, selected audio, a packet ID of subtitle graphic, and then stops playback (step S2). After that, the user inputs a playback resume instruction (step S3), then the CPU 21 reads the "Movie.title" file and determines whether or not the title stored in the nonvolatile memory 22 is a title of content whose playback can be controlled by the program running in the Java virtual machine (step S4).

In the step S4, if it is determined to be a title of content whose playback is not controlled by the program running in the Java virtual machine (without using the Java virtual machine), a position of a head of a GOP at a closest time to the stop time is searched from "index_info( )" in a clip file, and data is read out from a middle of a stream file which is indicated by "relative_byte" of the target GOP. The read-out data is separated by the demultiplexer 13 on the basis of the audio, the subtitle graphic and the packet ID stored in the nonvolatile memory 22, supplied to the video decoder 14, the audio decoder 16 and the subtitle decoder 15, superimposed with video data by the graphic superimposing unit 17, and outputted to the external display device 31 (step S7).

In the step S4, if it is determined to be a title of content whose playback can be controlled by the program operating in the Java virtual machine (with using the Java virtual machine), the CPU 21 judges whether "resume_enable" in the "Movie.title" file is "1" or not (step S5). In the step S5, if it is judged that "resume_enable" is "1", the processing proceeds to the step S7, resume playback is performed under similar procedures to those in the case of the title of content whose playback is not controlled by the program operating in the Java virtual machine (without using the Java virtual machine). If it is judged in the step S5 that "resume_enable" is "0", resume playback is not performed and playback is performed from a head of the optical disc 11 (step S6) in a similar sequence to that when the optical disc 11 is mounted, for example. In the step S6, playback may be restarted from a head of the content whose playback is stopped.

Figure 14B:
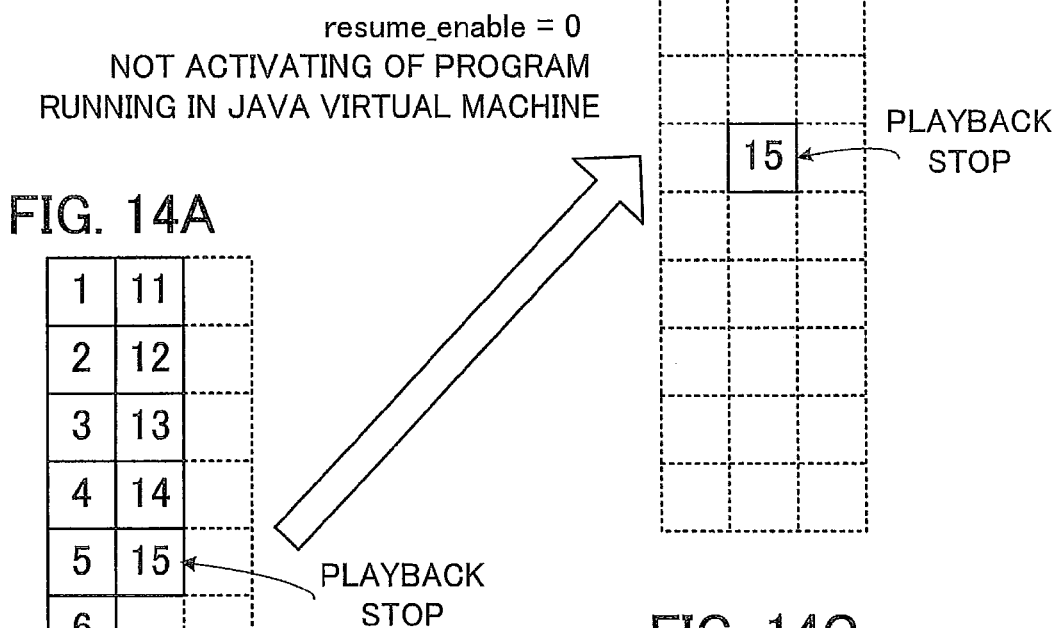
FIGS. 14A to 14C are diagrams for explaining the video information playback method according to the first embodiment of the present invention.
Figure 14A:
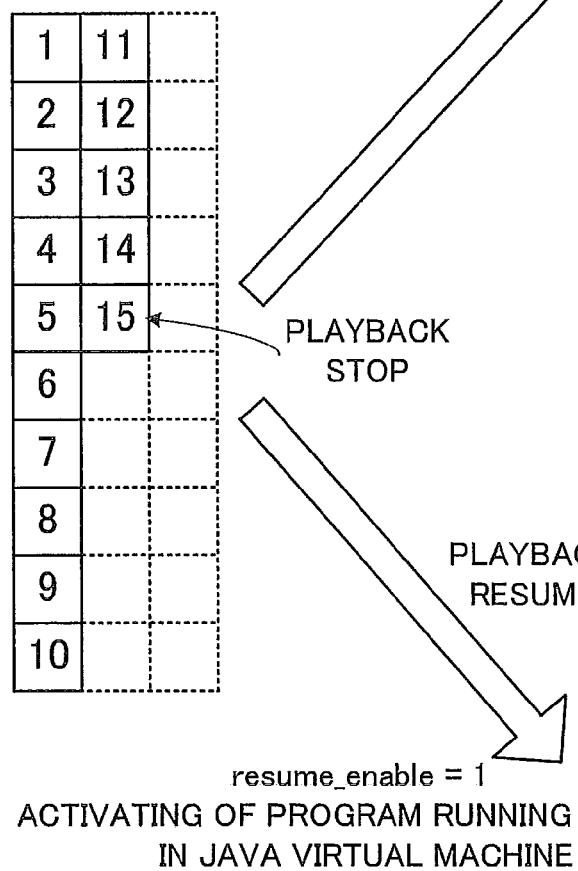
Figure 14C:
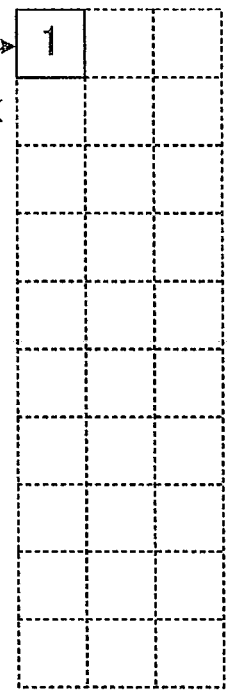

FIGS. 14A to 14C are diagrams for explaining the video information playback method according to the embodiment of the present invention. Playing back the content here contains playing back a single playlist file, displaying the panels with numerals in a order of '1', '2', '3', . . . , at one-second intervals after the playback starts, and terminating the application when the panel '30' is displayed and the playback of playlist is completed. Suppose if the playback is stopped at a time of displaying the panel '15', as illustrated in FIG. 14A. In the first embodiment, if the content is a program whose "resume_enable" is "0", i.e., a program which needs to be controlled by the program running in the Java virtual machine at a time of playback resume, the program running in the Java virtual machine is activated and playback is restarted from a head of the content, i.e., '1' (or a head of the optical disc and the like), as illustrated in FIG. 14C. If the content is a program whose "resume_enable" is "1", i.e., a program which may not be controlled by the program running in the Java virtual machine at a time of playback resume, the program running in the Java virtual machine is not activated (the panel is not displayed) and playback is resumed from the content playback stop position, i.e., '15', as illustrated in FIG. 14B.

As described above, the video information playback method, the video information playback device according to the first embodiment, or resume playback from the optical disc 11 according to the first embodiment by the video information playback device changes a playback method depending on the information of the determining "resume_enable" for determining whether or not to be content that no trouble is caused even if the Java program is not activated, and thereby enables to reduce a wait time until the resume playback starts when a main program of a movie and the like is played back.

Although the above explanation gives an example that the information of the determining "resume_enable" is contained in the "Movie.title" file, substantially the same effect can be obtained if the information of the determining is contained in another file.

Second Embodiment

In the first embodiment, the CPU 21 determines, on the basis of the "resume_enable" in the "Movie.title" file, whether a title of content whose playback is operated is a title whose playback should be controlled with activating the Java virtual machine or a title whose playback is possible without activating the Java virtual machine, and the determination is performed for each title. However, there is a case that a same title includes a position where resume playback is possible without activating the Java program and another position where playback is not possible without activating the Java program, depending on a position where playback is stopped. In the first embodiment, operations in such a case are not taken into account. So, in the second embodiment, it will be explained how to play back in the case that a same title includes a position where resume playback is possible without activating the Java program and another position where playback is not possible without activating the Java program, depending on a position where the playback is stopped. A video information playback method, a video information playback device and a recording medium in the second embodiment are the same as the method, the device and the recording medium in the first embodiment, except for the following playback operations. For this reason, FIG. 1 is also referred in the explanation of the second embodiment.

FIG. 15 is a flowchart illustrating the video information playback method according to the second embodiment of the present invention. FIG. 15 illustrates operations of the video information playback device after a user operates the video information playback device to stop playback until the video information playback device reaches a playback stop state. When the playback stop instruction is inputted through the user's operation (step S8), the CPU 21 stores various information currently being played back such as "title_id", a file name, a playback time, selected audio and a packet ID of subtitle graphic in the nonvolatile memory 22, and stops the playback (step S9). Next, if a title currently being played back is stopped in a position where resume playback is possible without activating Java, the Java program sets "resume_enable" in the nonvolatile memory 22 to be "1" (step S11); and if resume playback is not possible without activating Java, "resume_enable" in the nonvolatile memory 22 is set to be "0" (step S12). After performing the above operations, the video information playback device turns to the playback stop state.

FIG. 16 is a flowchart illustrating the video information playback method according to the second embodiment of the present invention. FIG. 16 illustrates operations of the video information playback device after the video information playback device in a suspended state receives a playback resume instruction through a user's operation (step S13) until the playback is restarted (steps S16, S17). When the user operates the playback operation (step S13), the CPU 21 determines whether the title of the content to be played back is a title using a Java virtual machine or not. At the time, if the CPU 21 determines to be a title of content whose playback is not controlled by the program running in the Java virtual machine (without using the Java virtual machine) ('No' in the step S14), a position of a head of a GOP at a closest time to the stop time is searched from "index_info( )" in a clip file, and data is read out from a middle of a stream file which is indicated by "relative_byte" of the target GOP. The read-out data is separated by the demultiplexer 13 on the basis of the audio, the subtitle graphic and the packet ID stored in the nonvolatile memory 22, supplied to the video decoder 14, the audio decoder 16 and the subtitle decoder 15, superimposed with video data by the graphic superimposing unit 17, and outputted to the external display device 31 (step S16).

In the step S14, if it is determined to be a title of content whose playback can be controlled by the program running in the Java virtual machine (with using the Java virtual machine), the CPU 21 judges whether "resume_enable" in the nonvolatile memory 22 is "1" or not (step S15). If it is judged in the step S15 that "resume_enable" is "1", the processing proceeds to the step S16 and resume playback is performed in a similar manner to that in the case of the title of content whose playback is controlled by the program running in the Java virtual machine (without using the Java virtual machine). If it is judged in the step S15 that "resume_enable" is "0", resume playback is not performed and the playback is performed from a head of the optical disc 11 in a similar sequence to that when the optical disc 11 is mounted (step S17), for example. In the step S17, the playback may be restarted from a head of the content whose playback is stopped.

As described above, the video information playback method, the video information playback device according to the second embodiment, or the resume playback from the optical disc 11 according to the second embodiment by the video information playback device changes a playback method depending on the information of the determining "resume_enable" for determining whether or not to be content that no trouble is caused even if the Java program is not activated, and thereby enables to reduce a wait time until the resume playback starts when a main program of a movie and the like is played back.

EXPLANATION OF REFERENCE NUMERALS AND SYMBOLS

10 playback unit; 11 optical disc (recording medium); 12 drive; 13 demultiplexer; 14 video decoder; subtitle decoder; 16 audio decoder; 17 graphic superimposing unit; 21 CPU (determination means, playback control means); 22 nonvolatile memory; 31 external display device; 41 resume_enable (information of the determining).

What is claimed is:

1. A video information playback method of playing back a virtual-machine-using content from a recording medium by a video information playback device; the recording medium having thereon:
    a virtual machine;
    one or more virtual-machine-using contents whose video playback can be controlled by a program running in a virtual machine; and
    a program for determining whether each of the one or more virtual-machine-using contents is a first type content capable of being played back either when the program running in the virtual machine is activated or deactivated, or a second type content capable of being played back only when the program running in the virtual machine is activated;
    the method comprising the steps of:
    determining whether the virtual-machine-using content is the first type content or the second type content when a playback stop instruction to stop playback of a virtual-machine-using content currently being played back is given from a user, thereby recording information of the determining in a memory of the video information playback device;
    reading the information of the determining regarding the virtual-machine-using content to be playback-resumed when a playback resume instruction is inputted to the video information playback device, thereby determining whether the virtual-machine-using content to be playback-resumed is the first type content or the second type content; and
    resuming playback from a playback stop position without activating the program running in the virtual machine if the virtual-machine-using content to be playback-resumed is determined to be the first type content, and resuming playback after activating the program running in the virtual machine if the virtual-machine-using content to be playback-resumed is determined to be the second type content.

2. The method according to claim 1, wherein in the step of resuming the playback, when the virtual-machine-using content to be playback-resumed is determined to be the first type content, the playback is resumed from the playback stop position.

3. The method according to claim 1, wherein in the step of resuming the playback, when the virtual-machine-using content to be playback-resumed is determined to be the second type content, the playback is resumed from a head of the recording medium or a head of the virtual-machine-using content to be playback-resumed.

4. The method according to claim 1, wherein in the step of recording the information of the determining, the program running in the virtual machine records the information of the determining in the memory of the video information playback device.

5. The method according to claim 1, wherein the virtual machine is a Java virtual machine.

6. A video information playback device configured to play back a virtual-machine-using content from a recording medium, the recording medium having thereon:
    a virtual machine;
    one or more virtual-machine-using contents whose video playback can be controlled by a program running in the virtual machine; and
    a program for determining whether each of the one or more virtual-machine-using contents is a first type content capable of being played back either when the program running in the virtual machine is activated or deactivated, or a second type content capable of being played back only when the program running in the virtual machine is activated,
    the video information playback device comprising a computer processor programmed to execute a process of:
    determining by the program information of whether the virtual-machine-using content is the first type content or the second type content when a playback stop instruction to stop playback of a virtual-machine-using content currently being played back is given from a user, and recording the determined information in a memory of the video information playback device;
    reading the determined information regarding the virtual-machine-using content to be playback-resumed when a playback resume instruction is inputted to the video information playback device, and determining whether the virtual-machine-using content to be playback-resumed is the first type content or the second type content; and resuming playback from a playback stop position without activating the program running in the virtual machine if the virtual-machine-using content to be playback-resumed is determined to be the first type content, and resuming playback after activating the program running in the virtual machine if the virtual-machine-using content to be playback-resumed is determined to be the second type content.

7. The video information playback device according to claim 6, wherein when the virtual-machine-using content to be playback-resumed is determined to be the first type content, the video information playback device resumes playback from the playback stop position.

8. The video information playback device according to claim 6, wherein when the virtual-machine-using content to be playback-resumed is determined to be the second type content, the video information playback device resumes playback from a head of the recording medium or a head of the virtual-machine-using content to be playback-resumed.

9. The video information playback device according to claim 6, wherein the virtual machine is a Java virtual machine.

10. A non-transitory recording medium, on which information for playing back video content by the video information playback device is recorded,
the information including:
a virtual machine;
one or more virtual-machine-using contents whose video playback can be controlled by a program running in a virtual machine; and
a program running in the virtual machine for determining whether each of the one or more virtual-machine-using contents is a first type content capable of being played back either when the program running in the virtual machine is activated or deactivated, or a second type content capable of being played back only when the program running in the virtual machine is activated.

11. The recording medium according to claim 10, the virtual machine is a Java virtual machine.

12. Video content, which is stored on a non-transitory recording medium, to be played back by a video information playback device, the video content including:
a virtual machine;
one or more virtual-machine-using contents whose video playback can be controlled by a program running in the virtual machine; and
a program running in the virtual machine for determining whether each of the virtual-machine-using contents is a first type content capable of being played back either when the program running in the virtual machine is activated or deactivated, or a second type content capable of being played back only when the program running in the virtual machine is activated.

13. A video information playback method of playing back a virtual-machine-using content from a recording medium by a video information playback device, the recording medium having thereon:
a virtual machine;
one or more virtual-machine-using contents whose video playback can be controlled by a program running in the virtual machine; and
information of determining indicating whether each of the one or more virtual-machine-using contents is a first type content capable of being played back either when the program running in the virtual machine is activated or deactivated, or a second type content capable of being played back only when the program running in the virtual machine is activated;
the method comprising the steps of:
reading the information of the determining regarding the virtual-machine-using content to be playback-resumed, when a playback resume instruction is inputted to the video information playback device after playback of a virtual-machine-using content currently being played back is stopped, and determining whether the virtual-machine-using content to be playback-resumed is the first type content or the second type content; and
resuming playback from a playback stop position without activating the program running in the virtual machine if the virtual-machine-using content to be playback-resumed is determined to be the first type content, and resuming playback after activating the program running in the virtual machine if the virtual-machine-using content to be playback-resumed is determined to be the second type content.

14. The method according to claim 13, wherein in the step of resuming the playback, when the virtual-machine-using content to be playback-resumed is determined to be the second type content, the playback is resumed from a head of the recording medium or a head of the virtual-machine-using content to be playback-resumed.

15. The method according to claim 13, wherein
the program running in the virtual machine related to the first type content is a program being selectively activated in response to a user's operation, and
the program running in the virtual machine related to the second type content is a program being activated concurrently with playback of the second type content.

16. The method according to claim 13, wherein the virtual machine is a Java virtual machine.

17. A video information playback device configured to play back a virtual-machine-using content from a recording medium, the recording medium having thereon:
a virtual machine;
one or more virtual-machine-using contents whose video playback can be controlled by a program running in the virtual machine; and
information of determining indicating whether each of the one or more virtual-machine-using contents is a first type content capable of being played back either when the program running in the virtual machine is activated or deactivated, or a second type content capable of being played back only when the program running in the virtual machine is activated,
the video information playback device comprising a computer processor programmed to execute a process of:
reading the information of determining regarding the virtual-machine-using content to be playback-resumed when a playback resume instruction is inputted to the video information playback device after playback of the virtual-machine-using content currently being played back is stopped, and determining whether the virtual-machine-using content to be playback-resumed is the first type content or the second type content; and
causing the video information playback device to resume playback from a playback stop position without activating the program running in the virtual machine if the virtual-machine-using content to be playback-resumed is determined to be the first type content, and causing the video information playback device to resume playback after activating the program running in the virtual machine if the virtual-machine-using content to be playback-resumed is determined to be the second type content.

18. The video information playback device according to claim 17, wherein when the virtual-machine-using content to be playback-resumed is determined to be the second type content, the video information playback device resumes playback from a head of the recording medium or a head of the virtual-machine-using content to be playback-resumed.

19. The video information playback device according to claim 17, wherein
the program running in the virtual machine related to the first type content is a program being selectively activated in response to a user's operation, and
the program running in the virtual machine related to the second type content is a program being activated concurrently with playback of the second type content.

20. The video information playback device according to claim 17, wherein the virtual machine is a Java virtual machine.

21. A non-transitory recording medium on which information for playing back video content by a video information playback device is recorded;
the information including:
a virtual machine;
one or more virtual-machine-using contents whose video playback can be controlled by a program running in the virtual machine; and
information of determining indicating whether each of the one or more virtual-machine-using contents is a first type content capable of being played back either when the program running in the virtual machine is activated or deactivated, or a second type content capable of being played back only when the program running in the virtual machine is activated.

22. The recording medium according to claim 21, wherein
the program running in the virtual machine related to the first type content is a program being selectively activated in response to a user's operation; and
the program running in the virtual machine related to the second type content is a program being activated concurrently with playback of the second type content.

23. The recording medium according to claim 21, wherein the virtual machine is a Java virtual machine.

24. Video content, which is stored a non-transitory recording medium, to be played back by a video information playback device;
the video content including:
a virtual machine;
one or more virtual-machine-using contents whose video playback can be controlled by a program running in the virtual machine; and
information of determining indicating whether each of the one or more virtual-machine-using contents is a first type content capable of being played back either when the program running in the virtual machine is activated or deactivated, or a second type content capable of being played back only when the program running in the virtual machine is activated.

* * * * *